US006823378B2

(12) United States Patent
Ullmann

(10) Patent No.: US 6,823,378 B2
(45) Date of Patent: Nov. 23, 2004

(54) METHOD AND APPARATUS IN NETWORK MANAGEMENT SYSTEM FOR PERFORMANCE-BASED NETWORK PROTOCOL LAYER FIREWALL

(75) Inventor: Lorin Evan Ullmann, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 665 days.

(21) Appl. No.: 09/740,247

(22) Filed: Dec. 18, 2000

(65) Prior Publication Data

US 2002/0078190 A1 Jun. 20, 2002

(51) Int. Cl.[7] .............................................. G06F 15/173
(52) U.S. Cl. ........................ 709/223; 713/200; 713/201
(58) Field of Search ................................ 713/200, 201; 709/223, 224, 225, 226, 230, 231, 232, 233, 234, 235, 236, 237

(56) References Cited

U.S. PATENT DOCUMENTS

| | | | |
|---|---|---|---|
| 5,359,593 A | | 10/1994 | Derby et al. .................. 370/17 |
| 5,790,554 A | | 8/1998 | Pitcher et al. ............... 370/471 |
| 5,864,669 A | * | 1/1999 | Osterman et al. ........... 709/203 |
| 6,049,549 A | | 4/2000 | Ganz et al. .................. 370/449 |
| 6,084,955 A | | 7/2000 | Key et al. .................... 379/220 |
| 6,128,657 A | * | 10/2000 | Okanoya et al. ............ 709/224 |
| 6,438,592 B1 | * | 8/2002 | Killian ........................ 709/224 |

FOREIGN PATENT DOCUMENTS

WO  PCTSE9902279  12/1999

* cited by examiner

Primary Examiner—Frantz B. Jean
Assistant Examiner—Hassan Phillips
(74) Attorney, Agent, or Firm—Jeffrey LaBaw; Anne V. Dougherty

(57) ABSTRACT

A method and apparatus for implementing a performance-based firewall at the protocol layer. Application Action Objects (AAOs) are created for requesting applications and are mapped to specific protocol events. Each AAO is then used as a Usage Based Firewall (UBF) to monitor all usage of the protocol at the endpoint identified by the application, thereby acting as a performance-based, protocol layer firewall for communications at that endpoint. A responsible logical gateway monitors the AAO and reports AAO activity to a UBF Manager at a control server to direct the AAO regarding continued usage based on bandwidth considerations

21 Claims, 4 Drawing Sheets

US 6,823,378 B2

METHOD AND APPARATUS IN NETWORK MANAGEMENT SYSTEM FOR PERFORMANCE-BASED NETWORK PROTOCOL LAYER FIREWALL

FIELD OF THE INVENTION

This invention relates to distributed computing systems and more particularly to a system and method for managing the distribution of bandwidth at an endpoint of a distributed computing network.

BACKGROUND OF THE INVENTION

Distributed data processing networks with thousands of nodes, or endpoints, are known in the prior art. The nodes can be geographically dispersed and the computing environment managed in a distributed manner with a plurality of computing locations running distributed kernels services (DKS). The managed environment can be logically separated into a series of loosely connected managed regions in which each region has its own management server for managing local resources. The management servers coordinate activities across the network and permit remote site management and operation. Local resources within one region can be exported for the use of other regions in a variety of manners.

Managed regions within a highly distributed network may attempt to incorporate fault-tolerance with firewalls that attempt to limit any damage that might be caused by harmful entities. A firewall can prevent certain types of network traffic from reaching devices that reside on the "other" side, beyond the firewall. For example, a firewall can examine the frame types or other information of incoming data packets (i.e., so-called "packet sniffing") and decide to stop certain types of information that has previously been determined to be harmful, such as virus probes, pings, broadcast data, etc. Another use of such firewalls is to influence the distribution of bandwidth by denying access to certain types of communications which may unnecessarily consume needed bandwidth. Yet another role of a firewall is to prevent outside entities' attempts to breach an internal network (or network devices located beyond the firewall) to steal information and/or attack (i.e., "hack") the network. While existing firewalls can prevent certain entities from obtaining information from the protected network devices, firewalls can simultaneously present a barrier to the operation of legitimate, useful processes.

A firewall typically comprises a static dedicated piece of code that operates by using a dedicated port. Each software component communicates with another component by knowing the dedicated port number of the other component. However, memory and other system constraints can eventually limit the number and the management of dedicated ports, and the dynamic reconfiguration of port numbers can be quite difficult. Another drawback to the static firewall system which is executed at the device driver level (i.e., the packet sniffing type firewall) is that the component must necessarily look at every packet which traverses that port. Given the quantity of communications in vast distributed networks, the analysis of every data packet can be an overwhelming task. If communications could be screened based on protocol, a significant amount of packet analysis could be foregone.

Yet another drawback to the presently available firewall technology is that it provides a "yes" or "no" approach to evaluating communications, whereby usage is either permitted or denied. There exists no mechanism today for a performance-based analysis of network communications at a firewall in order to allow continued usage provided that the bandwidth being consumed is within predetermined limits.

It is desirable, therefore, and is an object of the present invention, to have a method and apparatus for providing a performance-based firewall in a distributed network environment.

Another object of the present invention is to provide a firewall which can dynamically influence distribution of bandwidth in a network.

Yet another object of the present invention is to provide a firewall at the protocol layer rather than the packet layer.

SUMMARY OF THE INVENTION

The foregoing and other objects are realized by the present invention wherein a method and apparatus are disclosed for implementing a performance-based firewall at the protocol layer. Application Action Objects (AAOs) are created for requesting applications and are mapped to specific protocol events. Each AAO is then used as a Usage Based Firewall (UBF) to monitor all usage of the protocol at the endpoint identified by the application, thereby acting as a performance-based, protocol layer firewall for communications at that endpoint. A responsible logical gateway monitors the AAO and reports AAO activity to a UBF Manager at a control server to direct the AAO regarding continued usage based on bandwidth considerations.

BRIEF DESCRIPTION OF THE DRAWINGS

The invention will now be described in greater detail with specific reference to the appended drawings wherein.

DESCRIPTION OF THE PREFERRED EMBODIMENT

Figure 1:
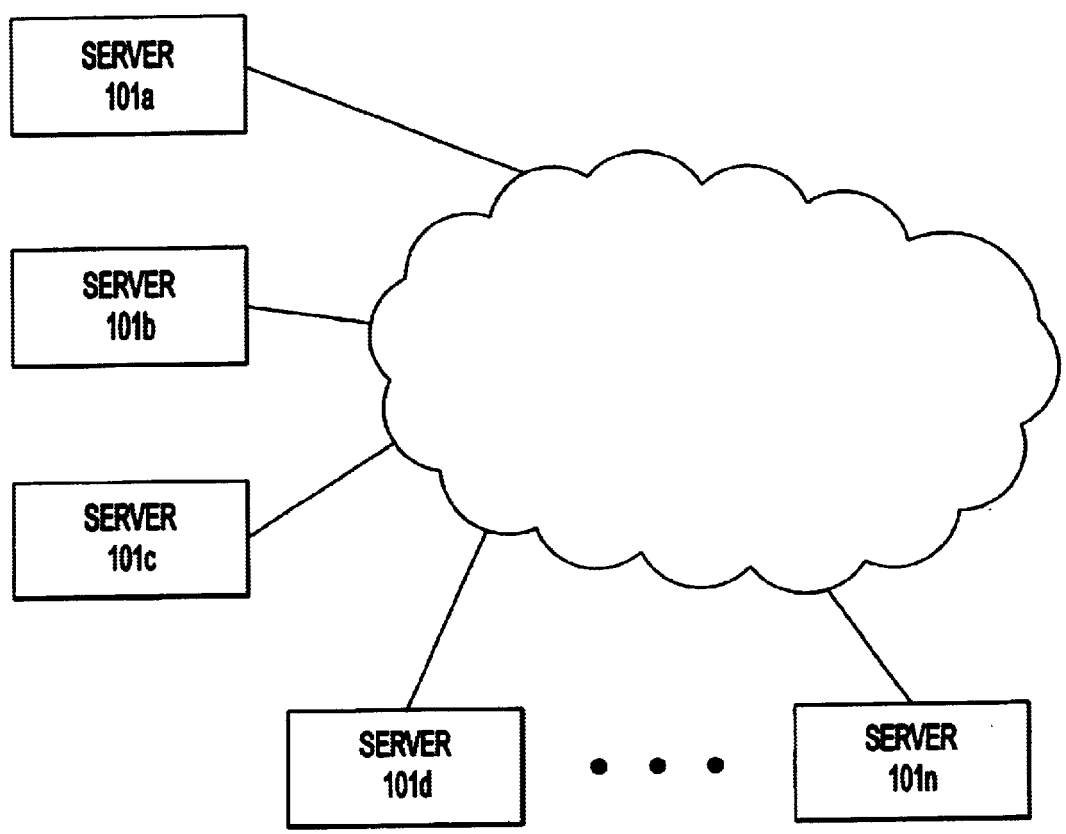
FIG. 1 provides a general schematic diagram of a distributed network environment.

The present invention can be implemented in any network with multiple servers and a plurality of endpoints; and is particularly advantageous for vast networks having hundreds of thousands of endpoints in which an application would like to exercise endpoint control over communications. FIG. 1 provides a schematic illustration of a network for implementing the present invention. Among the plurality of servers, 101a–101n as illustrated, at least one of the servers, 101a in FIG. 1, which already has some of the distributed kernel services (DKS), is designated as a Usage Based Firewall (UBF) control server for the purposes of implementing the present invention.

A network has many endpoints, with endpoint being defined, for example, as one Network Interface Card (NIC) with one MAC address, IP Address. The control server 101a in accordance with the present invention has the components illustrated in FIG. 2 for providing a method including the steps of: receiving an application request for a firewall at a network endpoint; creating an Application Action Object in response to a request from an application which wishes to control what flows to the endpoint; registering the protocol request and obtaining a session number for the AAO from the UBF Manager at the control server; returning or deploying the AAO to the requesting application to act as the UBF for the endpoint; and, monitoring activities at the AAO and responding thereto.

Figure 2:
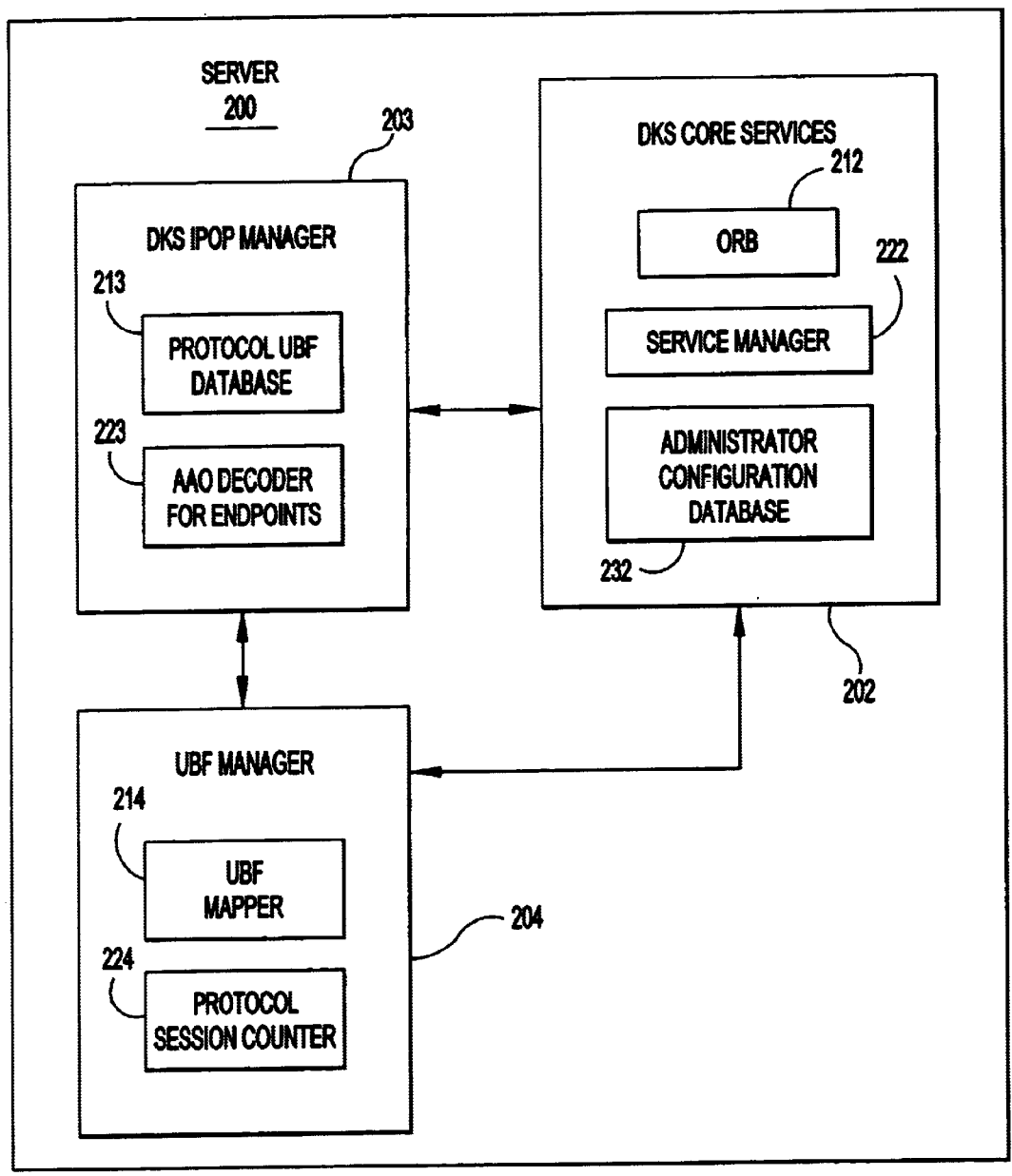
FIG. 2 provides a more specific schematic diagram of the components in a control server of the distributed network in accordance with the present invention.

FIG. 2 illustrates in greater detail the control server components which are relevant to the implementation of the present invention. Additional core server components and their functionality, as have been detailed in co-pending application entitled "METHOD AND SYSTEM FOR MANAGEMENT OF RESOURCE LEASES IN AN APPLICATION FRAMEWORK SYSTEM", Ser. No. 09/738,307, filed Dec. 15, 2000, the teachings of which are incorporated by reference herein (Docket AUS9-2000-0699), are not repeated in detail in this description, since those components and their functionality do not change for the specific implementation of the present invention being described herein. As shown in FIG. 2, the server 200 includes the already-available DKS core services at component 202, which services include the object request broker (ORB) 212, service manager 222, and the Administrator Configuration Database 232, among other standard DKS services. The ORB 212 will create the Application Action Objects (AAOs) in response to application requests to the server and pass those AAOs to sit at the specified endpoints, as further detailed below. The Administrator Configuration Database 232 will include stored definitions for the allowable protocol for endpoints and the endpoint addresses, along with endpoint-specific usage values (e.g., maximum numbers for requests for an endpoint per minute and/or per hour) or default values, for use in performance-based analysis (discussed below) when administrating the firewall in operation.

The DKS Internet Protocol Object Persistence (IPOP) Manager 203 provides the functionality for gathering network data, as is detailed in the aforementioned co-pending patent application, along with an Application Action Object (AAO) Decoder for endpoints 223, discussed below, and a Protocol Usage Based Firewall (UBF) Database 213 for endpoints, the latter two components being specific to the present invention. The inventive role of the IPOP Manager components is to keep track of metrics to estimate bandwidth at an AAO deployed at an endpoint and to compare those monitored values to system administrator-defined thresholds (stored at the Administrator Configuration Database 232). In addition to the enhanced IPOP Manager 203, the server of the present invention includes a Usage Based Firewall (UBF) Manager 204, the functions of which are further detailed below. The UBF Manager 204 includes a UBF Mapper 214 for mapping Application Action Objects (AAOs) to protocol events and a Database 224 comprising Protocol Session Counter per Application data for use as further discussed below.

The specific roles of the relevant components of FIG. 2 will become apparent in the following discussion of the operations of the present invention. Because distributed kernel services are available in the distributed network, the present system can control at which endpoint a so-called "traveling" firewall is placed. Furthermore, the present invention allows the traveling endpoint firewall to be protocol-specific such that, rather than implementing a generic "GetSocket( . . . )" command as in the prior art to statically deploy a packet layer firewall, the present invention can effectively implement a "GetFTPSocket", "GetPingSocket", or other protocol-specific command at an endpoint to act as a protocol-specific firewall. Finally, the inventive firewall is an "interactive" session object, the actions or performance of which can be monitored to prevent overuse of the endpoint.

Figure 3:
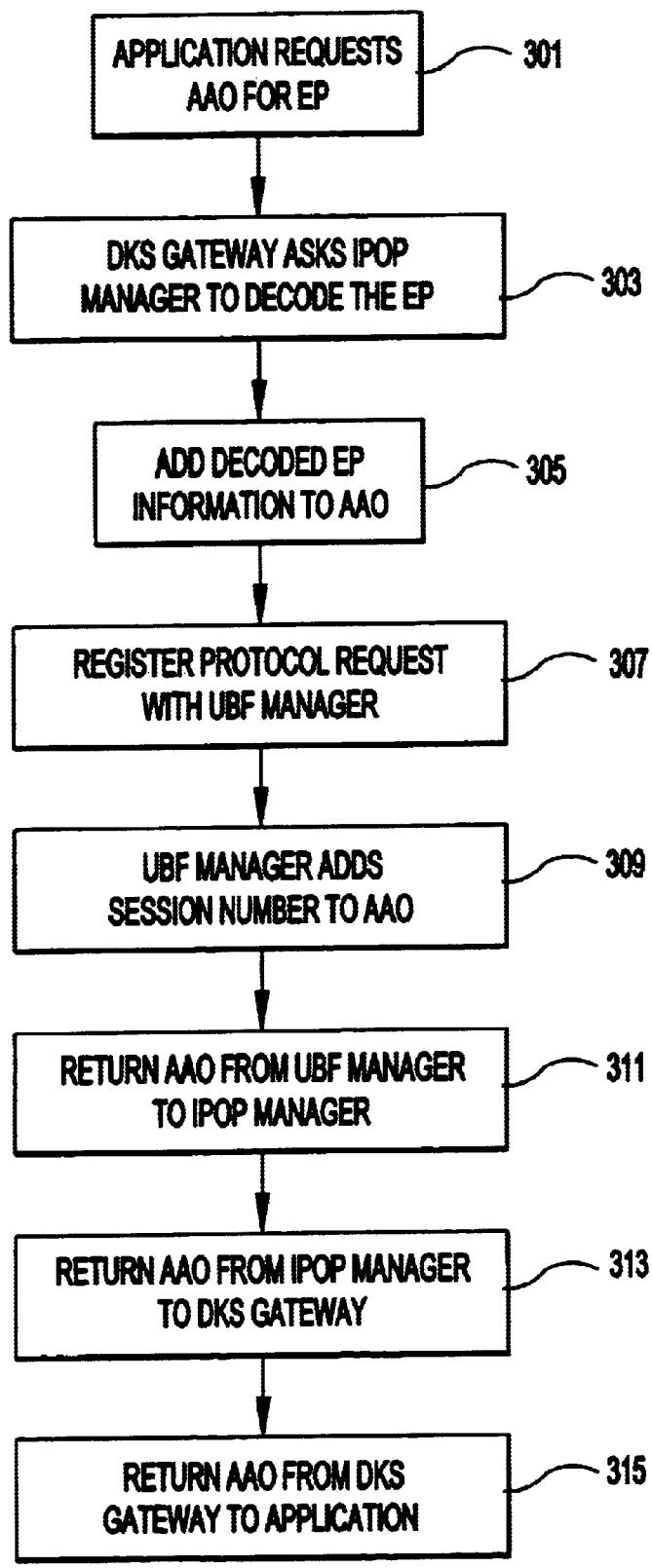
FIG. 3 provides a representative process flow for implementing a protocol specific, usage based firewall at an endpoint in accordance with the present invention.

FIG. 3 provides a representative process flow for implementing the protocol-specific, interactive, usage-based firewall at an endpoint in accordance with the present invention. When an application wishes to control what flows to a specific endpoint, the application will request an Application Action Object (AAO) from the ORB at the server in step 301. The request is handled by a logical DKS Gateway (not shown) which asks the IPOP Manager to decode the endpoint at step 303. In order to decode the endpoint, the DKS Gateway takes a Object Identifier (IPOPOid) and determines the physical network address of the target endpoint in addition to determining which DKS Gateway(s) will be used to route this action object request. The decoded information from the AAO Decoder 223 of IPOP Manager 203 is provided to the ORB to be added to the AAO at step 305. Next, for requests in which the protocol is specified, the IPOP Manager registers the protocol request with the UBF Manager 204 at step 307. If the request does not specify a protocol, the UBF Mapper is used to determine the protocol for the request (e.g., a "move" application action object request would invoke the use of the File Transfer Protocol (FTP)) prior to registering the protocol.

At step 309, the UBF Manager adds a session number to the AAO, which session number will be used for monitoring all usage of the protocol by the UBF Manager. Thereafter, the AAO with session number is returned to the IPOP Manager at step 311. The IPOP returns the AAO to the logical DKS Gateway at 313, followed by returning the AAO to the application at step 315.

Figure 4:
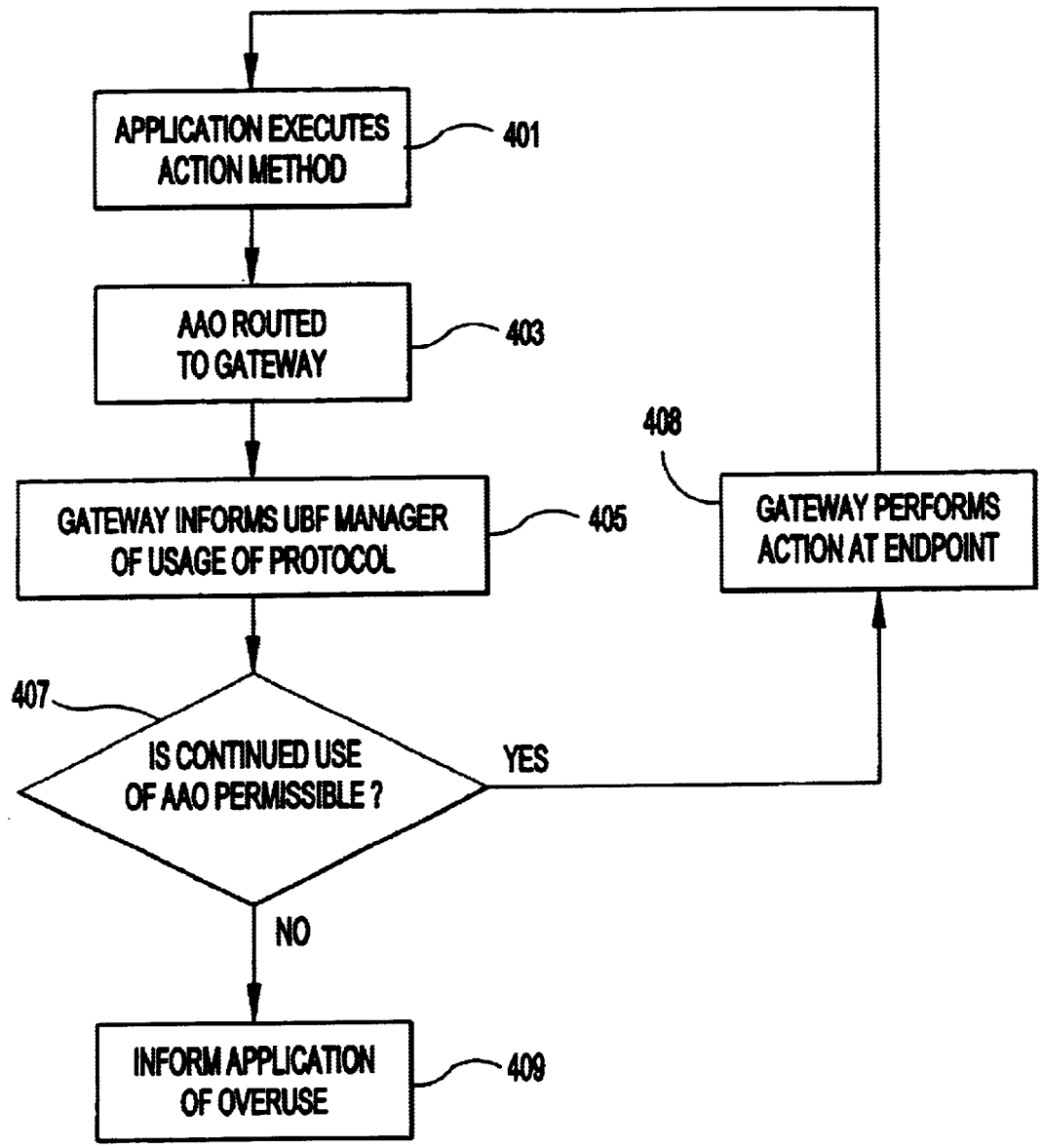
FIG. 4 provides a representative process flow for evaluating the continued usage of a usage based firewall which has been deployed to control communications that flow to a network endpoint.

In operation, the AAO will be used by the application and its use will optimally be monitored for performance-based analysis. FIG. 4 provides a representative process flow for evaluating the continued usage of a usage based firewall which has been deployed to control that which flows to a network endpoint. When an application uses the AAO, for example to ping the endpoint, at step 401, the use comprises executing an action method which initiates routing of the AAO to a responsible gateway at 403. The gateway, in turn, notifies the UBF Manager at step 405 that the protocol has been used. The gateway uses the session number which is in the AAO when notifying the UBF Manager so that the AAO is appropriately identified. Again using the session number, the gateway asks the UBF manager at 407 if continued usage of the AAO at the endpoint is permissible. The UBF Protocol Session Counter Database 224 will retrieve the configured maximums for requests for the protocol/application combination, obtain the current count of requests for the protocol/application combination from the Protocol Session Counter 224, and will compare the current count to the configured maximum. If the current count does not exceed the configured maximum, then the UBF will notify the gateway that it may perform the action at the endpoint at 408. If the configured maximum is exceeded, such that the determination at decision box 407 is that continued use is impermissible, the application will be informed of the overuse at step 409. In addition to notifying the application of the overuse problem, the UBF may optionally identify to the application at least one other endpoint which is currently underused.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for providing a protocol layer firewall for an endpoint in a distributed network comprising at least one server having at least an object request broker and a usage based firewall manager and a plurality of computing locations each having at least one endpoint, comprising the steps of:

receiving a protocol request from an application requesting a protocol-specific Application Action Object (AAO) from the at least one server;

decoding the endpoint to determine a physical network address for said endpoint;

creating an AAO with said decoded information;

registering the protocol request with the usage based firewall manager and obtaining a session number for said AAO;

adding the session number to the AAO; and returning the AAO to the application to operate as a protocol-specific firewall at said endpoint.

2. The method of claim 1 further comprising monitoring the protocol usage at the endpoint.

3. The method of claim 2 wherein said monitoring of the protocol usage comprises the steps of:

said application executing an action method on said AAO;

routing the AAO to a responsible gateway in response to said action method; and notifying the usage based firewall manager that the protocol has been used.

4. The method of claim 3 further comprising the step of determining if continued usage of the AAO at the endpoint is permissible.

5. The method of claim 4 wherein said determining comprises the steps of:

retrieving stored maximums of requests for the protocol and application;

obtaining a current request count for the protocol and application;

comparing the current count to the configured maximum; and notifying the application of the results of said comparing.

6. The method of claim 4 further comprising ceasing usage of said AAO based on said determining.

7. The method of claim 5 further comprising ceasing usage of said AAO based on said determining.

8. The method of claim 6 further comprising identifying an alternative endpoint to said application.

9. The method of claim 7 further comprising identifying an alternative endpoint to said application.

10. A system for providing a protocol layer firewall for an endpoint in a distributed network in response to an application request comprising:

at least one object request broker for creating at least one application action object comprising a protocol-specific firewall in response to an application request; and a usage based firewall manager for establishing a session for monitoring said at least one application action object at said endpoint.

11. The system of claim 10 further comprising at least one decoder component for decoding the endpoint.

12. The system of claim 10 further comprising monitoring means for monitoring the protocol usage at the endpoint.

13. The system of claim 12 wherein said monitoring means comprises at least one logical gateway for detecting action requests at said application action object and for notifying the usage based firewall manager that the protocol has been used.

14. The system of claim 13 wherein said usage based firewall manager further comprises a determining component for determining if continued usage of the AAO at the endpoint is permissible.

15. The system of claim 14 further comprising at least one storage location for storing configuration information regarding maximum requests per endpoint and wherein said determining component includes a comparator for comparing the current count of requests at the endpoint to the stored maximum requests for that endpoint.

16. The system of claim 14 further comprising means for identifying at least one alternative endpoint to said application.

17. A program storage device readable by machine, tangibly embodying a program of instructions executable by the machine to perform method steps for providing a protocol layer firewall for an endpoint in a distributed network comprising at least one server having at least an object request broker and a usage based firewall manager and a plurality of computing locations each having at least one endpoint, said method comprising the steps of:

receiving a protocol request from an application requesting a protocol-specific Application Action Object (AAO) at the at least one server;

decoding the endpoint to determine a physical network address for said endpoint;

creating an AAO with said decoded information;

registering the protocol request with the usage based firewall manager and obtaining a session number for said AAO;

adding the session number to the AAO; and returning the AAO to the application to operate as a protocol-specific firewall at said endpoint.

18. The program storage device of claim 17 wherein said method further comprises monitoring the protocol usage at the endpoint.

19. The program storage device of claim 18 wherein said method further comprises the steps of:

determining if continued usage of the AAO at the endpoint is permissible; and notifying the application about the results of said determining.

20. The program storage device of claim 19 wherein said determining method comprises the steps of:

retrieving stored maximums of requests for the protocol and application;

obtaining a current request count for the protocol and application; and comparing the current count to the configured maximum.

21. The program storage device of claim 19 wherein said method further comprises monitoring activity at a plurality of endpoints and identifying at least one alternative endpoint to said application.

* * * * *